United States Patent
Tsilfidis et al.

(10) Patent No.: US 11,610,593 B2
(45) Date of Patent: *Mar. 21, 2023

(54) METHODS AND SYSTEMS FOR PROCESSING AND MIXING SIGNALS USING SIGNAL DECOMPOSITION (71) Applicant: Meta Platforms Technologies, LLC, Menlo Park, CA (US)

(72) Inventors: Alexandros Tsilfidis, Athens (GR); Elias Kokkinis, Patras (GR)

(73) Assignee: Meta Platforms Technologies, LLC, Menlo Park, CA (US)

(*) Notice: Subject to any disclaimer, the term of this patent is extended or adjusted under 35 U.S.C. 154(b) by 153 days.

This patent is subject to a terminal disclaimer.

(21) Appl. No.: 16/674,135

(22) Filed: Nov. 5, 2019

(65) Prior Publication Data
US 2020/0075030 A1 Mar. 5, 2020

Related U.S. Application Data (63) Continuation of application No. 14/265,560, filed on Apr. 30, 2014, now Pat. No. 10,468,036.

(51) Int. Cl.
*G10L 15/04* (2013.01)
*G10L 19/02* (2013.01)
*G10L 19/008* (2013.01)
*H04R 3/00* (2006.01)
*H04S 7/00* (2006.01)
*G10L 21/0272* (2013.01)

(52) U.S. Cl.
CPC ............ *G10L 19/008* (2013.01); *G10L 15/04* (2013.01); *G10L 19/0204* (2013.01); *G10L 21/0272* (2013.01); *H04R 3/005* (2013.01); *H04S 7/30* (2013.01)

(58) Field of Classification Search
CPC .............. G10L 19/009; G10L 19/0204; G10L 21/0272; G10L 19/008; H04R 3/005
See application file for complete search history.

(56) References Cited

U.S. PATENT DOCUMENTS

| 5,490,516 | A | | 2/1996 | Hutson |
| 5,758,315 | A | * | 5/1998 | Mori .................... G10L 19/0204 704/229 |
| 6,008,866 | A | * | 12/1999 | Komatsu ................ H04N 5/144 348/E5.065 |
| 6,263,312 | B1 | | 7/2001 | Kolesnik et al. |
| 6,301,365 | B1 | | 10/2001 | Yamada et al. |
| 6,393,198 | B1 | | 5/2002 | LaMacchia |
| 6,542,869 | B1 | | 4/2003 | Foote |
| 6,606,600 | B1 | | 8/2003 | Murgia et al. |

(Continued)

FOREIGN PATENT DOCUMENTS

WO  WO 2013/030134  3/2013

OTHER PUBLICATIONS

Pedersen, Michael Syskind, et al. "Two-microphone separation of speech mixtures." IEEE Transactions on Neural Networks 19.3: 475-492. (Year: 2008).*

(Continued)

*Primary Examiner* — Daniel C Washburn
*Assistant Examiner* — Oluwadamilola M Ogunbiyi
(74) *Attorney, Agent, or Firm* — Fenwick & West LLP (57) ABSTRACT

A method for mixing, processing and enhancing signals using signal decomposition is presented. A method for improving sorting of decomposed signal parts using cross-component similarity is also provided.

22 Claims, 9 Drawing Sheets

(56) References Cited

U.S. PATENT DOCUMENTS

| | | | |
|---|---|---|---|
| 8,103,005 B2 | 1/2012 | Goodwin et al. | |
| 8,130,864 B1 | 3/2012 | Lee et al. | |
| 8,370,134 B2* | 2/2013 | Briand | G10L 19/008 |
| | | | 381/23 |
| 8,380,331 B1 | 2/2013 | Smaragdis et al. | |
| 9,230,558 B2* | 1/2016 | Disch | G10L 21/04 |
| 9,363,598 B1 | 6/2016 | Yang | |
| 9,584,940 B2 | 2/2017 | Tsilfidis et al. | |
| 9,812,150 B2 | 11/2017 | Kokkinis et al. | |
| 9,918,174 B2 | 3/2018 | Tsilfidis et al. | |
| 10,366,705 B2 | 7/2019 | Kokkinis et al. | |
| 10,468,036 B2 | 11/2019 | Tsilfidis et al. | |
| 2003/0078024 A1 | 4/2003 | Magee et al. | |
| 2003/0191638 A1 | 10/2003 | Droppo et al. | |
| 2004/0213419 A1 | 10/2004 | Varma et al. | |
| 2004/0220800 A1 | 11/2004 | Kong et al. | |
| 2005/0069162 A1 | 3/2005 | Haykin et al. | |
| 2005/0143997 A1 | 6/2005 | Huang et al. | |
| 2005/0232445 A1 | 10/2005 | Vaudrey et al. | |
| 2006/0056647 A1 | 3/2006 | Ramakrishnan et al. | |
| 2006/0109988 A1 | 5/2006 | Metcalf | |
| 2006/0112811 A1 | 6/2006 | Padhi et al. | |
| 2007/0165871 A1* | 7/2007 | Roovers | H04R 3/005 |
| | | | 381/66 |
| 2007/0195975 A1 | 8/2007 | Cotton et al. | |
| 2007/0225932 A1 | 9/2007 | Halford | |
| 2008/0021703 A1* | 1/2008 | Kawamura | H04R 3/005 |
| | | | 704/226 |
| 2008/0019548 A1 | 6/2008 | Avendano | |
| 2008/0130924 A1 | 6/2008 | Vaudrey et al. | |
| 2008/0152235 A1 | 6/2008 | Bashyam et al. | |
| 2008/0167868 A1 | 7/2008 | Kanevsky et al. | |
| 2008/0232603 A1 | 9/2008 | Soulodre | |
| 2008/0266706 A1* | 10/2008 | Yamagishi | G11B 5/3967 |
| 2008/0288566 A1 | 11/2008 | Umeno et al. | |
| 2009/0003615 A1* | 1/2009 | Roovers | H04M 9/082 |
| | | | 381/66 |
| 2009/0006038 A1* | 1/2009 | Jojic | G06K 9/6226 |
| | | | 702/190 |
| 2009/0080632 A1 | 3/2009 | Zhang et al. | |
| 2009/0086998 A1 | 4/2009 | Jeong et al. | |
| 2009/0094375 A1 | 4/2009 | Lection | |
| 2009/0128571 A1 | 5/2009 | Smith et al. | |
| 2009/0132245 A1 | 5/2009 | Wilson et al. | |
| 2009/0150146 A1 | 6/2009 | Cho et al. | |
| 2009/0231276 A1 | 9/2009 | Ullrich et al. | |
| 2009/0238377 A1 | 9/2009 | Ramakrishnan et al. | |
| 2010/0094643 A1 | 4/2010 | Avendano et al. | |
| 2010/0111313 A1 | 5/2010 | Namba et al. | |
| 2010/0124154 A1* | 5/2010 | Yu | G11B 20/10009 |
| 2010/0138010 A1 | 6/2010 | Aziz Sbai et al. | |
| 2010/0174389 A1 | 7/2010 | Blouet et al. | |
| 2010/0180756 A1 | 7/2010 | Fliegler et al. | |
| 2010/0185439 A1 | 7/2010 | Crockett | |
| 2010/0202700 A1 | 8/2010 | Rezazadeh et al. | |
| 2010/0241438 A1* | 9/2010 | Oh | G10L 19/008 |
| | | | 704/500 |
| 2010/0298676 A1* | 11/2010 | Addison | A61B 5/726 |
| | | | 600/324 |
| 2010/0332222 A1 | 12/2010 | Bai et al. | |
| 2011/0058685 A1 | 3/2011 | Sagayama et al. | |
| 2011/0064242 A1 | 3/2011 | Parikh et al. | |
| 2011/0078224 A1 | 3/2011 | Wilson et al. | |
| 2011/0194709 A1 | 8/2011 | Ozerov et al. | |
| 2011/0206223 A1 | 8/2011 | Ojala | |
| 2011/0255725 A1 | 10/2011 | Faltys et al. | |
| 2011/0261977 A1 | 10/2011 | Hiroe | |
| 2011/0264456 A1 | 10/2011 | Koppens et al. | |
| 2012/0101401 A1 | 4/2012 | Faul et al. | |
| 2012/0101826 A1 | 4/2012 | Visser et al. | |
| 2012/0128165 A1 | 5/2012 | Visser et al. | |
| 2012/0130716 A1 | 5/2012 | Kim | |
| 2012/0143604 A1 | 6/2012 | Singh | |
| 2012/0163513 A1 | 6/2012 | Park et al. | |
| 2012/0189140 A1 | 7/2012 | Hughes | |
| 2012/0207313 A1 | 8/2012 | Ojanpera | |
| 2012/0213376 A1 | 8/2012 | Hellmuth et al. | |
| 2012/0308015 A1 | 12/2012 | Ramteke | |
| 2013/0021431 A1 | 1/2013 | Lemmey et al. | |
| 2013/0070928 A1 | 3/2013 | Ellis et al. | |
| 2013/0132082 A1 | 5/2013 | Smaragdis | |
| 2013/0194431 A1 | 8/2013 | O'Connor et al. | |
| 2013/0230121 A1 | 9/2013 | Molko et al. | |
| 2013/0297296 A1 | 11/2013 | Yoo et al. | |
| 2013/0297298 A1 | 11/2013 | Yoo et al. | |
| 2014/0037110 A1 | 2/2014 | Girin et al. | |
| 2014/0218536 A1 | 8/2014 | Anderson, Jr. et al. | |
| 2014/0328487 A1 | 11/2014 | Hiroe | |
| 2014/0358534 A1 | 12/2014 | Sun et al. | |
| 2015/0077509 A1 | 3/2015 | Ben Natan et al. | |
| 2015/0181359 A1 | 6/2015 | Kim et al. | |
| 2015/0211079 A1 | 7/2015 | Datta et al. | |
| 2015/0221334 A1 | 8/2015 | King et al. | |
| 2015/0222951 A1 | 8/2015 | Ramaswamy | |
| 2015/0235555 A1 | 8/2015 | Claudel | |
| 2015/0235637 A1 | 8/2015 | Casado et al. | |
| 2015/0248891 A1 | 9/2015 | Adami et al. | |
| 2015/0264505 A1 | 9/2015 | Tsilfidis et al. | |
| 2016/0064006 A1 | 3/2016 | Disch et al. | |
| 2016/0065898 A1 | 3/2016 | Lee | |
| 2018/0176705 A1 | 6/2018 | Tsilfidis et al. | |

OTHER PUBLICATIONS

U.S. Appl. No. 14/011,981, filed Aug. 28, 2013, U.S. Pat. No. 9,812,150.

U.S. Appl. No. 15/804,675, filed Nov. 6, 2017, U.S. Pat. No. 10,366,705.

U.S. Appl. No. 16/521,844, filed Jul. 25, 2019.

U.S. Appl. No. 14/645,713, filed Mar. 12, 2015.

U.S. Appl. No. 15/218,884, filed Jul. 25, 2016, U.S. Pat. No. 9,584,940.

U.S. Appl. No. 15/443,441, filed Feb. 27, 2017, U.S. Pat. No. 9,918,174.

U.S. Appl. No. 15/899,030, filed Feb. 19, 2018.

U.S. Appl. No. 14/265,560, filed Apr. 30, 2014, U.S. Pat. No. 10,468,036.

U.S. Appl. No. 16/521,844, filed Jul. 25, 2019, Kokkinis et al.

Cichocki, Andrzej et al. "Nonnegative Matrix and Tensor Factorizations: Applications to Exploratory Multi-Way Data Analysis and Blind Source Separation" Chapter, 1, Sections 1.4.3 and 1.5; John Wiley & Sons, 2009.

Frederic, John "Examination of Initialization of Techniques for Nonnegative Matrix Factorization" Georgia State University Digital Archive @ GSU; Department of Mathematics and Statistics, Mathematics Theses; Nov. 21, 2008.

Guy-Bart, Stan et al. "Comparison of Different Impulse Response Measurement Techniques" Sound and Image Department, University of Liege, Institute Montefiore B28, Sart Tilman, B-4000 Liege 1 Belgium, Dec. 2002.

Huang, Y.A., et al. "Acoustic MIMO Signal Processing; Chapters6—Blind Identification of Acoustic MIMO systems" Springer US, 2006, pp. 109-167.

Schmidt, Mikkel et al. "Single-Channel Speech Separation Using Sparse Non-Negative Matrix Factorization" Informatics and Mathematical Modelling, Technical University of Denmark, Proceedings of Interspeech, pp. 2614-2617 (2006).

Wilson, Kevin et al. "Speech Denoising Using Nonnegative Matrix Factorization with Priors" Mitsubishi Electric Research Laboratories; IEEE International Conference on Acoustics, Speech and Signal Processing, pp. 4029-4032; Aug. 2008.

European Search Report for European Patent Application No. 15001261.5, dated Sep. 8, 2015.

Office Action for U.S. Appl. No. 14/011,981, dated May 5, 2015.

Office Action for U.S. Appl. No. 14/011,981, dated Jan. 7, 2016.

Office Action for U.S. Appl. No. 14/011,981, dated Jul. 28, 2016.

Office Action for U.S. Appl. No. 14/011,981, dated Feb. 24, 2017.

Advisory Action for U.S. Appl. No. 14/011,981, dated Aug. 10, 2017.

(56) References Cited

OTHER PUBLICATIONS

Notice of Allowance for U.S. Appl. No. 14/011,981, dated Sep. 12, 2017.
Notice of Allowance for U.S. Appl. No. 15/804,675, dated Mar. 20, 2019.
Office Action for U.S. Appl. No. 14/645,713 dated Apr. 21, 2016.
Notice of Allowance for U.S. Appl. No. 15/218,884 dated Dec. 22, 2016.
Office Action for U.S. Appl. No. 15/443,441 dated Apr. 6, 2017.
Notice of Allowance for U.S. Appl. No. 15/443,441 dated Oct. 26, 2017.
Office Action for U.S. Appl. No. 15/899,030 dated Mar. 27, 2018.
Office Action for U.S. Appl. No. 15/899,030 dated Jan. 25, 2019.
Office Action for U.S. Appl. No. 14/265,560 dated Nov. 3, 2015.
Office Action for U.S. Appl. No. 14/265,560 dated May 9, 2016.
Office Action for U.S. Appl. No. 14/265,560 dated May 17, 2017.
Office Action for U.S. Appl. No. 14/265,560 dated Nov. 30, 2017.
Advisory Action for U.S. Appl. No. 14/265,560 dated May 17, 2018.
Non-Final Office Action for U.S. Appl. No. 14/265,560 dated Nov. 2, 2018.
Notice of Allowance for U.S. Appl. No. 14/265,560 dated Jun. 13, 2019.
Vincent, Emmanuel et al. "Adaptive Harmonic Spectral Decomposition for Multiple Pitch Estimation" IEEE Transactions on Audio, Speech, and Language Processing, vol. 18. No. 3, Mar. 2010.
Office Action for U.S. Appl. No. 16/521,844, dated Jan. 28, 2021.
Office Action for U.S. Appl. No. 16/521,844, dated Jun. 4, 2021.
Notice of Allowance for U.S. Appl. No. 16/521,844, dated Sep. 27, 2021.

* cited by examiner

METHODS AND SYSTEMS FOR PROCESSING AND MIXING SIGNALS USING SIGNAL DECOMPOSITION

CROSS-REFERENCE TO RELATED APPLICATIONS

This application is a Continuation of U.S. patent application Ser. No. 14/265,560, filed Apr. 30, 2014, now U.S. Pat. No. 10,468,036, the entirety of which is incorporated herein by reference. This application is also related to application Ser. No. 14/011,981, entitled "METHODS AND SYSTEMS FOR IMPROVED SIGNAL DECOMPOSITION," filed Aug. 28, 2013, the contents of which are hereby incorporated by reference in its entirety.

TECHNICAL FIELD

Various embodiments of the present disclosure relate to using signal decomposition methods for mixing or processing signals. Aspects of the invention relate to all fields of signal processing including but not limited to speech, audio and image processing, radar processing, biomedical signal processing, medical imaging, communications, multimedia processing, forensics, machine learning, data mining, etc.

BACKGROUND

When capturing sound for live concerts, studio recording sessions or other applications, multiple microphones can be typically used. Some of these microphones are dedicated at capturing sound coming from an individual sound source, namely the close microphones. Their name originates from the fact that they are set close to the desired source. In real-life applications, the close microphones cannot perfectly isolate the desired sound source and capture other simultaneous sounds too. This phenomenon is called microphone leakage, microphone bleed or microphone spill and it is a well-known problem to the sound engineers since the early days of sound capturing. In typical sound engineer setups, there can also be microphones aiming to capture sound coming from a plurality of sources; these are sometimes called ambient or room microphones.

Although microphones are initially set according to a specific acoustic setup, the acoustic conditions during sound capturing may change. For example microphones and/or sound sources sometimes move around the acoustic scene. In other cases, microphones and/or sources are accidentally displaced. In all above cases the original number of microphones and the initial microphone setup might not be sufficient from the sound engineering point of view. Therefore, there is a need for exploring the output of as many microphones as possible.

The characteristics of the captured sound mainly depend on the acoustic path between the microphone and each source, the microphone specifications (e.g. frequency response, microphone directivity, etc), the sound source properties, the room acoustic characteristics (when not in open spaces), etc. Therefore, each sound signal captured by each microphone (either close or ambient) is unique and from the signal processing point of view it has distinctive spectral and temporal properties. While processing and mixing sounds, a sound engineer takes advantage of these distinctive characteristics of each captured signal. The diversity of captured signals often allows for a successful final result. Therefore, careful microphone selection and placement as well as the decision on the number of microphones of each setup are very important in sound engineering.

The cost of professional microphones, the available space, the cabling infrastructure, the need to avoid acoustic feedback and other practical limitations reduce the number of microphones that can be practically used in real-world setups. On the other hand, the more microphones are set for sound capturing, the more options for the engineer when mixing or processing sound. Therefore there is a need for methods and systems that provide new ways of using every available microphone in a concert or studio setup.

Multiple microphones are also used in speech applications, typically in order to improve the performance of speech enhancement algorithms. These microphones are sometimes assembled in devices like mobile phones, tablets, laptop or desktop computers, wearables, smart TVs and other smart appliances, etc. Multiple microphones can be also found pre-installed into specific environments (e.g. smart homes, conference centers, meeting rooms, outdoors, etc) or become available via distributed microphone networks. In such cases, there is a need for methods and systems that provide new ways of taking into account every available microphone when enhancing speech, improving automatic speech recognition performance, etc.

Signal decomposition methods are a set of techniques that decompose a signal into its "intrinsic" parts and they are often used for the extraction of desired signals from a mixture of sound sources (i.e. source separation). In some cases signal decomposition can be performed with methods such as: non-negative matrix factorization, non-negative tensor factorization, independent component analysis, principal component analysis, singular value decomposition, dependent component analysis, low-complexity coding and decoding, stationary subspace analysis, common spatial pattern, empirical mode decomposition, tensor decomposition, canonical polyadic decomposition, higher-order singular value decomposition, or tucker decomposition. Although there are single-channel signal decomposition methods, multi-channel approaches (where separation is performed in each or some of the available channels) can be beneficial. Such techniques can be applied in multichannel recordings resulting from multi-microphone setups of concerts and studio sessions, where high-quality sound processing is needed. In addition, there is a need to develop methods that fully take into account multichannel information when identifying the desired parts of decomposed signals. Overall, there is a need for improved multichannel signal decomposition methods and systems.

SUMMARY

Aspects of the invention relate to a method of using signal decomposition outputs for mixing/processing/enhancing sound sources.

Aspects of the invention also relate to a method of sorting decomposed signals using available multichannel information.

Aspects of the invention also relate to a method of improving sorting of decomposed signals using the envelopes of said signals.

BRIEF DESCRIPTION OF THE DRAWINGS

For a more complete understanding of the invention, reference is made to the following description and accompanying drawings, in which.

DETAILED DESCRIPTION

Hereinafter, embodiments of the present invention will be described in detail in accordance with the references to the accompanying drawings. It is understood that other embodiments may be utilized and structural changes may be made without departing from the scope of the present application.

The exemplary systems and methods of this invention will sometimes be described in relation to audio systems. However, to avoid unnecessarily obscuring the present invention, the following description omits well-known structures and devices that may be shown in block diagram form or otherwise summarized.

For purposes of explanation, numerous details are set forth in order to provide a thorough understanding of the present invention. It should be appreciated however that the present invention may be practiced in a variety of ways beyond the specific details set forth herein. The terms determine, calculate and compute, and variations thereof, as used herein are used interchangeably and include any type of methodology, process, mathematical operation or technique.

Figure 1:
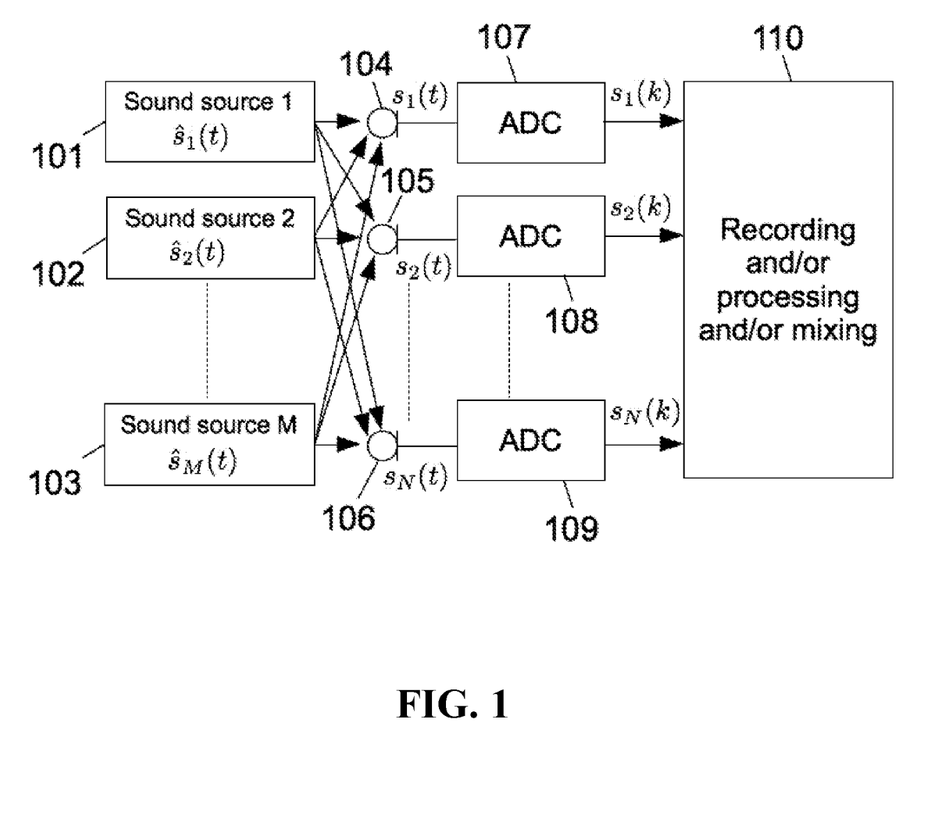
FIG. 1 illustrates an exemplary schematic representation of a method for capturing/processing/mixing sound.

FIG. 1 illustrates an exemplary case where any number of microphones 104, 105, . . . , 106 can be used to capture any number of sound sources 101, 102, . . . , 103. The number of microphones (N) can be lower, equal or higher to the number of sound sources (M). Note that microphone signals are signal mixtures, since microphones capture all simultaneous sound sources. A number of Analog to Digital Converters (ADCs) 107, 108, . . . , 109 can be used to convert the analog domain signals to the digital domain. The discrete signals can be then used for recording and/or mixing and/or processing 110. In some embodiments, the microphone signals can be also processed/altered in the analog domain before being fed into the ADCs.

In an exemplary sound engineering scenario, M sound sources are denoted with $\hat{s}_1(t), \hat{s}_2(t), \ldots, \hat{s}_M(t)$, where t is the continuous time index. These may refer to any sound source such as musical instruments, singers or other performers, noise sources, etc. The sound sources are captured by N microphones producing the corresponding analog domain microphone signals $s_1(t), s_2(t), \ldots, s_N(t)$. These processed or unprocessed signals can be transformed in the digital domain using an arbitrary number of ADCs, producing the corresponding discrete domain signals: $s_1(k), s_2(k), \ldots, s_N(k)$, where k represents the discrete time index. The ADCs can be placed in any device, including but not limited to the microphones, the mixing desk, external hardware etc. After obtaining the discrete signals, the sound engineer can proceed with the task at hand, for example processing and/or mixing.

Figure 2:
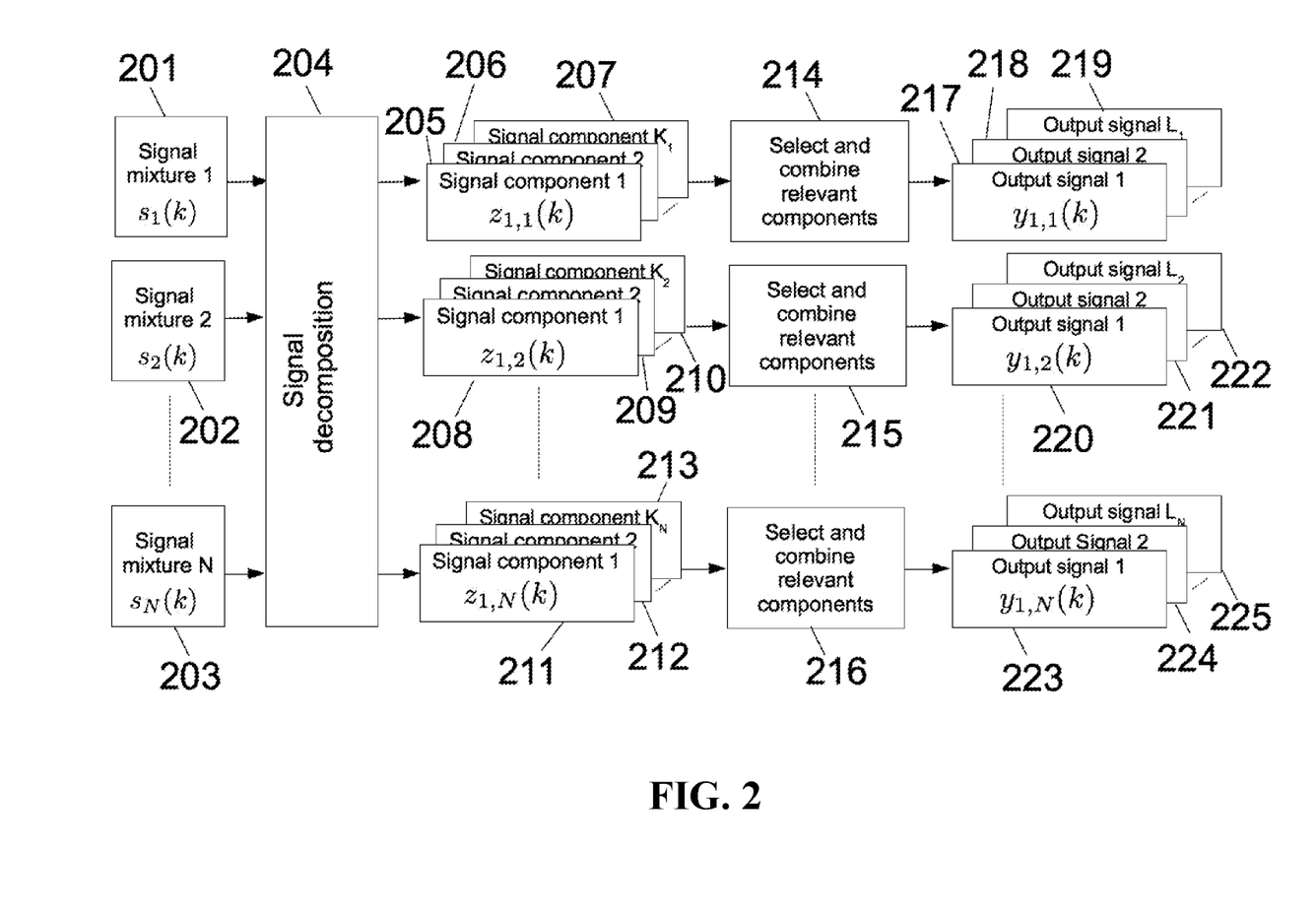
FIG. 2 illustrates an exemplary schematic representation of a method for multichannel signal decomposition.

In FIG. 2, an exemplary illustration of a decomposition of multiple input signals is presented. The term input signal, may refer to any digital signal or signal mixture and here it can also refer to a microphone signal in the discrete domain. A signal mixture can be defined as the sum of one ore more signals. A number of N input signals 201, 202, . . . , 203 is decomposed via any signal decomposition method 204. In a particular embodiment each input signal can be decomposed separately. In other embodiments, a group of the input signals or all the signals can be combined and decomposed simultaneously. Signal decomposition can be used as a tool to perform other signal processing tasks including but not limited to source separation, signal restoration, signal enhancement, noise removal and any form of signal mixing including but not limited to un-mixing, up-mixing, re-mixing, etc. After decomposition, each input signal is analyzed into a number of "intrinsic parts" or components 205, 206, . . . , 207 and 208, 209, . . . , 210 and 211, 212, . . . , 213. As explained in the related application Ser. No. 14/011,981, a component can be any part of the original input signal. The aforementioned components of each input signal are then selected and combined 214, 215, 216 and a number of output signals is produced 217, 218, . . . , 219, and 220, 221, . . . , 222 and 223, 224, . . . , 225.

In an exemplary embodiment, we consider a signal mixture captured from a microphone (see for example microphone 104 of FIG. 1). This signal captured from microphone 104 can be given by the equation:

$$s_1(t) = \Psi_1(\hat{s}_1(t)) + \Psi_2(\hat{s}_2(t)) + \ldots + \Psi_M(\hat{s}_M(t)) \quad (1)$$

where the operators $\Psi_{1,2,\ldots,M}$ denote any transformations altered in any way the original sound of the sound sources, while propagating between each source and microphone 104. In particular embodiments, the sources and the microphones are located in a closed space and the operators $\Psi_{1,2,\ldots,M}$ can denote convolutions with the corresponding room impulse responses. In other embodiments, the microphones and the sources can be in an open space and the operators $\Psi_{1,2,\ldots,M}$ denote filtering operations mainly representing the gain reduction due to source-receiver distance and the major reflections from nearby surfaces. The operators $\Psi_{1,2,\ldots,M}$ can also denote the effect of sound source directivity, microphone directivity and frequency response, etc.

In prior art, it is typically considered that the ideal output of a close microphone is the isolated signal coming from the sound source that one desires to capture. Under this assumption, microphone 104 would ideally capture only the sound of source 101 (FIG. 1), i.e.:

$$s_1(t) = \Psi_1(\hat{s}_1(t)) \approx \hat{s}_1(t) \quad (2)$$

Due to obvious physical limitations, capturing an isolated source is not practically possible. However, in the related application Ser. No. 14/011,981 decomposition methods for isolating the desired sound source via signal processing were presented.

In an embodiment of the present application a method for further exploring microphone signals using signal decomposition is presented. The method is valid for any type of microphone including but not limited to close microphones, ambient microphones, room microphones, etc. The method takes advantage of the fact that each microphone captures not only the source of interest, but also any other sound source that is active at the same time. For example, Equation 1 shows that the sound captured from microphone 1 contains not only a filtered version of the source of interest 101, but also filtered versions of all other M−1 sources 102, . . . , 103 in the form of microphone leakage. Therefore using signal decomposition, multiple signal outputs can be created from each input signal. By doing this, one can obtain multiple versions of each input signal from the sound captured by each microphone.

In FIG. 2, let's assume that $s_1(k)$, $s_2(k)$, . . . , $s_N(k)$ are microphone signals that capture N input sources denoted with $\hat{s}_1(k)$, $\hat{s}_2(k)$, . . . , $\hat{s}_N(k)$ and $\Psi_{1,1,\ldots N}$ are the operators denoting any transformation due to the source-microphone acoustic paths. Each microphone signal can produce many output signals, each one related to one of the input sources. For example, the following outputs can be produced from microphone signal 1:

$$y_{1,1}(k) \approx \Psi_{1,1}(\hat{s}_1(k)) \quad (3)$$

$$y_{1,2}(k) \approx \Psi_{1,2}(\hat{s}_2(k)) \quad (4)$$

$$\vdots$$

$$y_{1,N}(k) \approx \Psi_{1,N}(\hat{s}_N(k)) \quad (5)$$

Note that sometimes it's impossible to produce a good estimation of every input signal from each microphone signal. In such cases the output signals may contain any combination and/or transformation of the input signals.

In a particular embodiment, a sound engineer can take advantage of multiple output signals in order to enhance/mix/process the sound of a specific input source. For example, let's assume that the desired sound for input source signal 1 is denoted by $S_1(k)$. Then, $S_1(k)$ can be obtained by mixing the original microphone signal $s_1(k)$ with decomposed output signals from all microphones:

$$S_1(k)=F_1(s_1(k))F_2(y(1,1))+ \ldots +F_{N+1}(y(N,1)) \quad (6)$$

where the operators $F_1, F_2, \ldots, F_{N+1}$ account for any linear or non-linear post-processing. By performing the appropriate substitutions in Equation 6, it can be seen that $S_1(k)$ is derived using all available versions of sound signal $s_1(k)$:

$$S_1(k)=F_1(s_1(k))+F_2(\Psi_{1,1}(\hat{s}_1(k)))+ \ldots +F_{N+1}(\Psi_{N,1}(\hat{s}_1(k))) \quad (7)$$

Note that depending on the application, several terms of the Equations 6 and 7 can be ignored in the final mix (i.e. some of the operators $F_1, F_2, \ldots, F_{N+1}$ can be set to 0).

Figure 3:
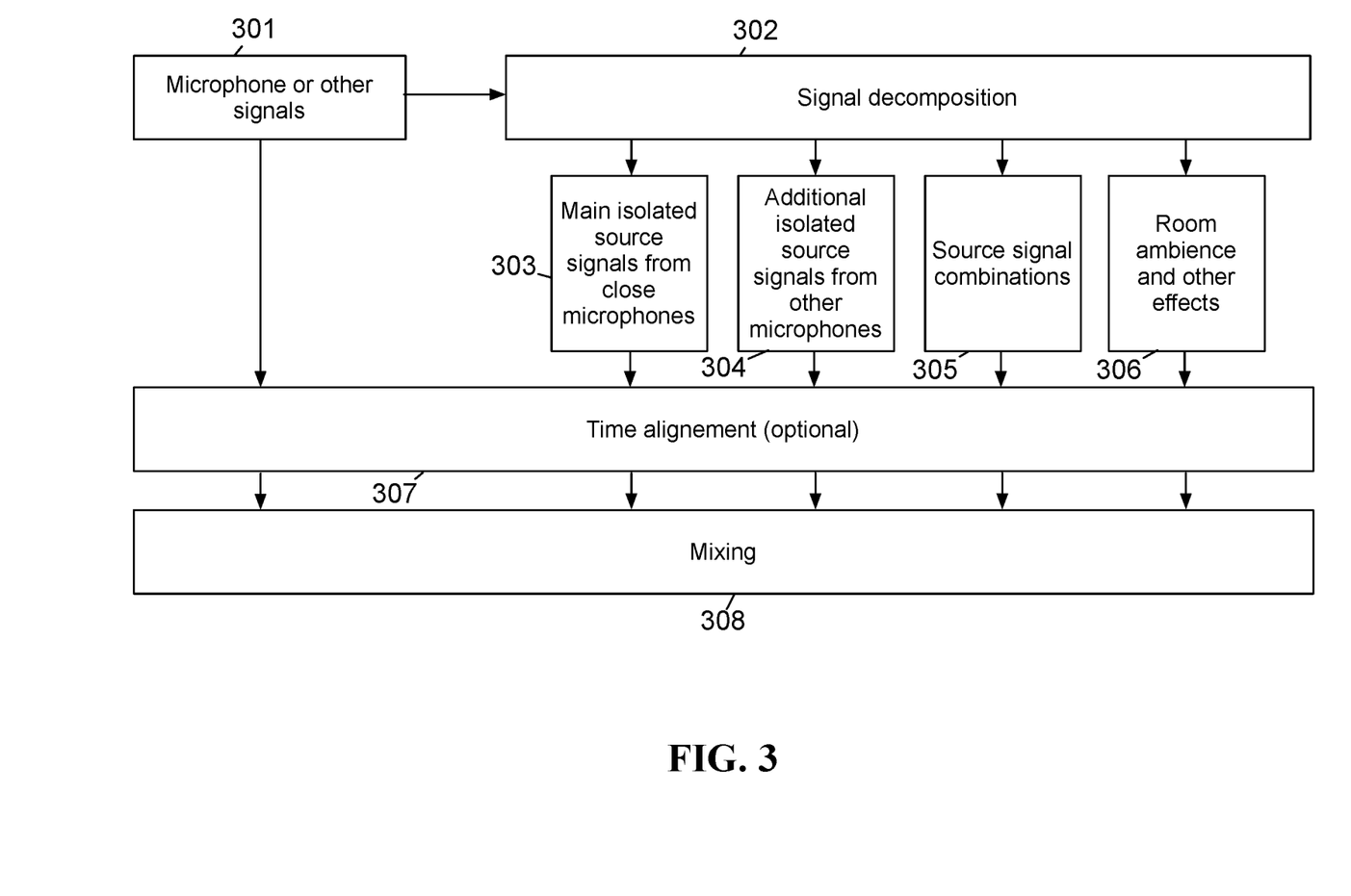
FIG. 3 illustrates an exemplary schematic representation of a method that explores signal decomposition for enhancing/mixing/processing signals.

In other embodiments, output signals from decomposition are not only used to enhance one or more input signals but also to provide more mixing/processing options. In a particular embodiment a plurality of microphone or other signals 301 are decomposed via any decomposition method 302. Several output signals can be produced, using the individual signal components extracted by the decomposition stage, including but not limited to:

The isolated sound sources can be extracted from the corresponding close microphones 303.

The sound of each source can be extracted from any microphone that captured said source 304.

Any useful combinations of the active sound sources that can be extracted from the microphone signals 305.

The room ambience or other effects such as the input signals' transients, the harmonic parts of the sound sources, the ambient noise, etc. 306.

When capturing signals with multiple microphones, the time-of-arrival will vary due to differences in source-receiver distances. When mixing or adding microphone signals this phenomenon causes an effect known as comb filtering. Therefore, an optional time-alignment stage that synchronizes the input signals and the decomposition outputs and ameliorates the comb filtering effect can be added 307. Finally, mixing/processing of the captured sounds can be done manually or automatically 308. Note that the signal decomposition stage can be either implemented in real-time or offline. Although in prior art microphone leakage is considered to cause significant problems in sound engineering, the present embodiment not only overcomes the problem but also uses leakage in an advantageous way for the mixing process.

In a particular embodiment, the method can be implemented using software inside a Digital Audio Workstation (DAW) program. The input signals can be loaded into separate tracks of the DAW and decomposition of a group (or all) of the signals can be performed. The user can optionally choose which signals to decompose or they can be selected automatically. The decomposition stage can be single- or multi-channel and it can be performed offline or in real-time. After the decomposition, output signals are produced and can be optionally time-aligned. Then they can become available for further processing/mixing inside the DAW.

Figure 4:
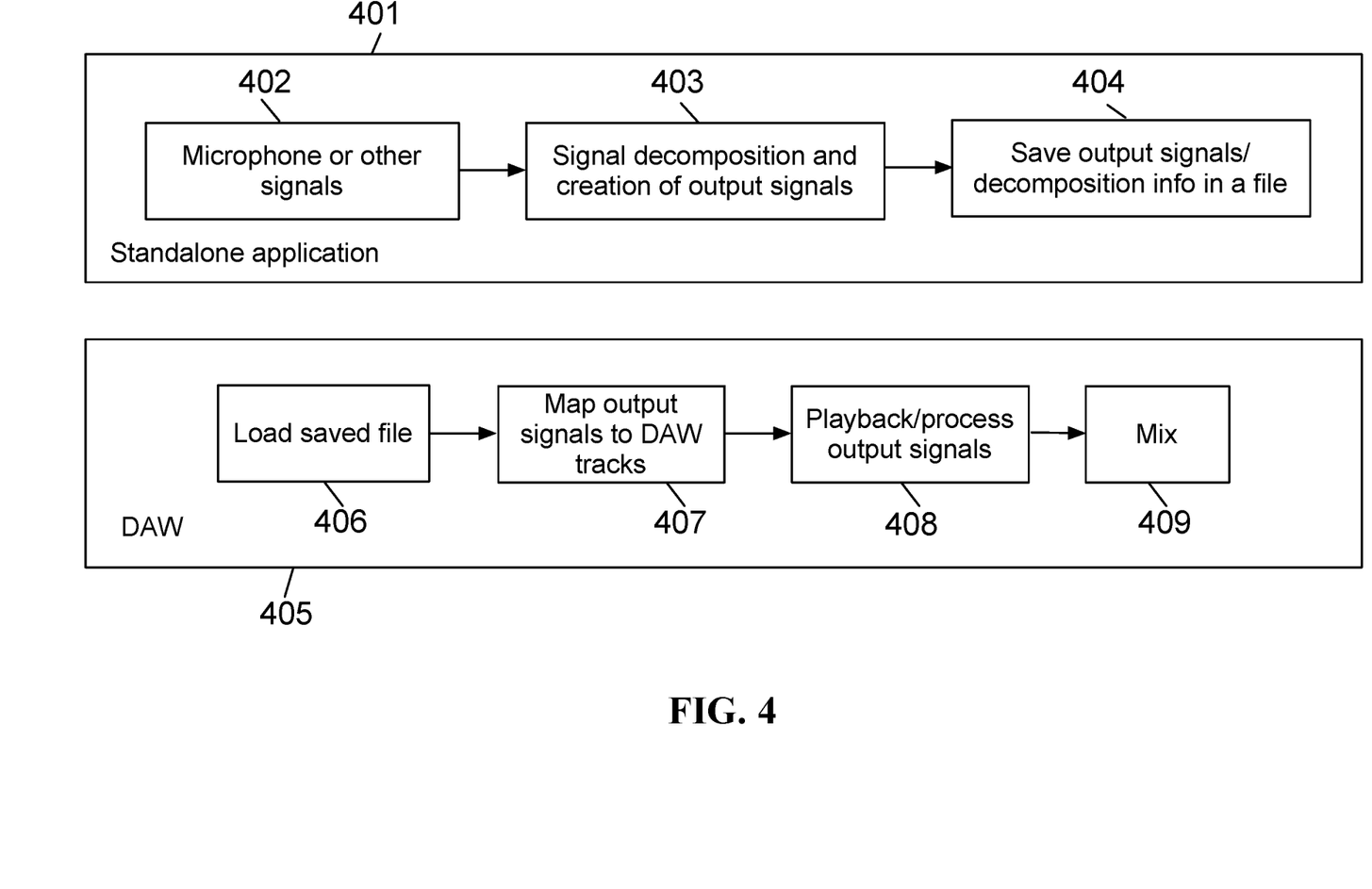
FIG. 4 illustrates an exemplary schematic representation of a mixing/processing method implemented by a standalone application and a Digital Audio Workstation.

In another embodiment, the method can be implemented in software, using a standalone application and a DAW (FIG. 4). The standalone application 401 can load the input signals 402 and perform signal decomposition 403. The decomposition components and/or decomposition outputs and/or any decomposition related info can be saved in a file that can be also used outside the standalone application 404. Then, the file can be loaded in a DAW 405. For this step, a software plugin can be used. When reading this file 406, decomposition components and/or decomposition outputs and/or any decomposition related info are available inside the DAW. A mapping of the decomposition-related signals to specific DAW tracks can be done either automatically or by the user 407. Then the aforementioned signals can be played back/processed inside the DAW 408 and used together with the original input signals for mixing and further processing 409.

Figure 5:
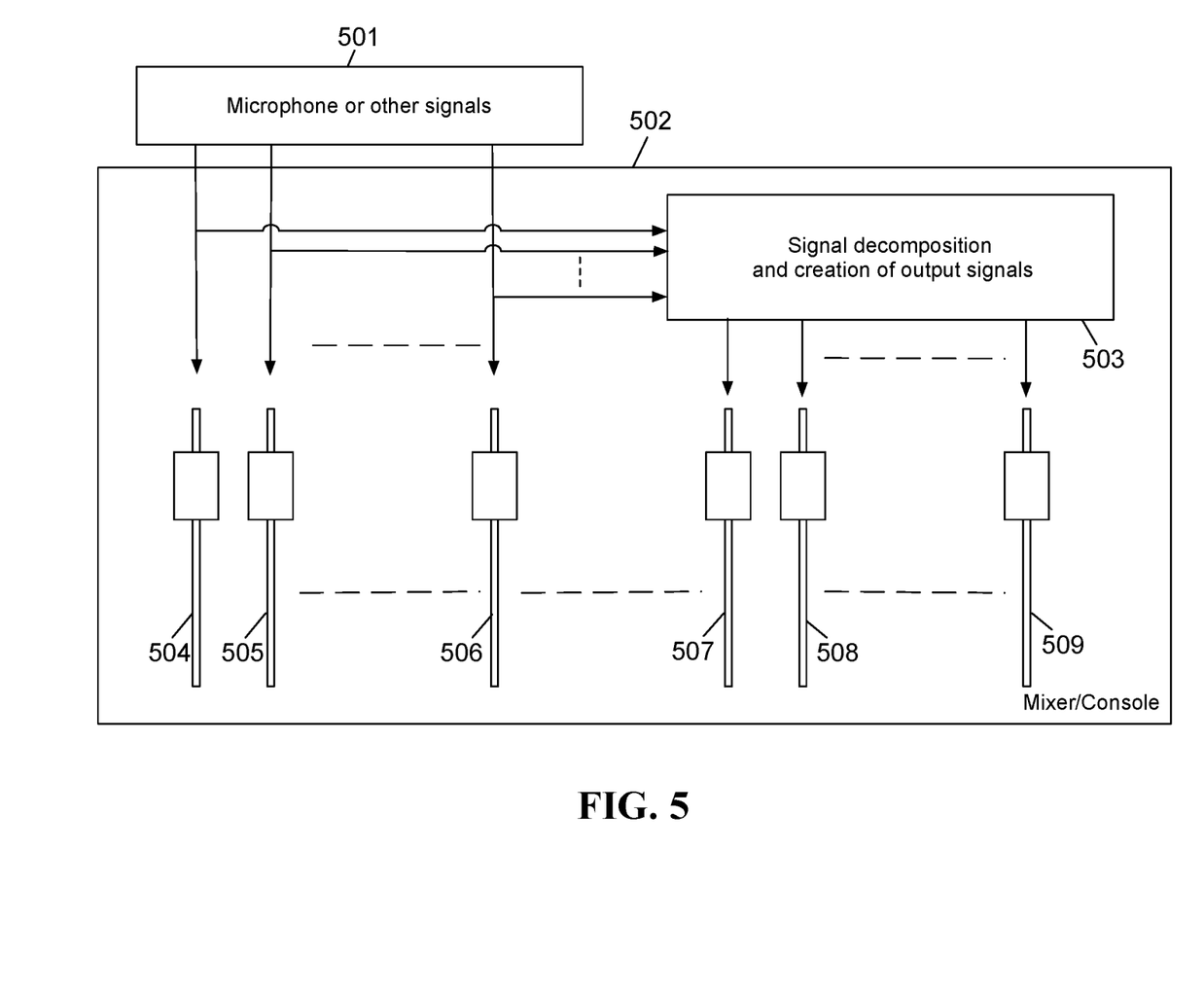
FIG. 5 illustrates an exemplary schematic representation of a mixing/processing method implemented in a console/mixer.

In another embodiment, the method can be implemented in hardware or in software inside a mixer/console 502 (FIG. 5). In a typical setup, microphone signals or any other sound signals 501 are fed into different channels of the mixer 504, 505, . . . , 506 for processing/mixing. In the present embodiment, a signal decomposition stage is added, resulting to the creation of output signals 503. This stage can be implemented in hardware or in software and it can be integrated inside the mixer or in any device. The output signals of the decomposition stage 503 are then fed into channels of the mixer 507, 508, . . . , 509 and they become available for further processing/mixing together with the original signals 501.

Figure 6:
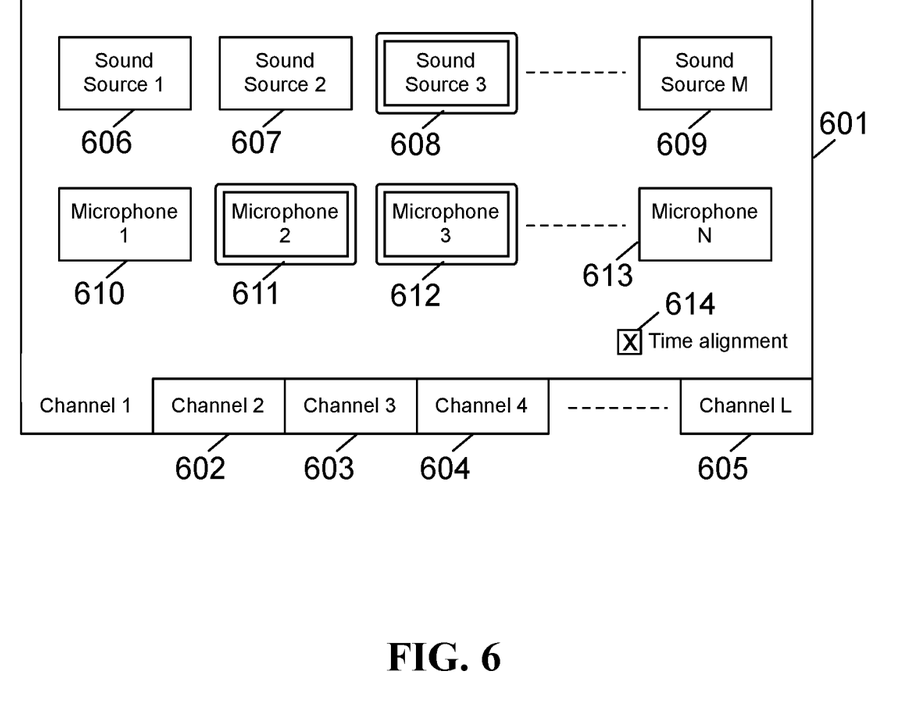
FIG. 6 illustrates an exemplary schematic representation of a method for advanced routing of audio signals.

In another embodiment, an advanced signal routing method can be implemented using the output signals from the signal decomposition stage (FIG. 6). A user can select different routing configurations for each mixing channel (or bus) 601, 602, 603, 604, . . . , 605. Then using an appropriate interface, the user can select the corresponding sound sources 606, 607, 608, . . . , 609 and microphones 610, 611, 612, . . . , 613. In FIG. 6 for example, sound source 3 as captured in microphones 2 and 3 is routed in channel 1. Note that a time-alignment option 614 can be also given to the user. The above interface that gives the means to route specific sources from each microphone can be implemented in any software or hardware form.

In another embodiment, a method can be implemented specifically for drum microphone signals. Microphone leakage is prominent in drum sound capturing, since (i) a large number of microphones is needed and (ii) due to space restrictions and the nature of the drum kit as an instrument it's not possible to set the microphones far away from each other. In such cases, drum microphone signals can be decomposed via any signal decomposition method. Then, output signals containing each isolated drum sound can be extracted from each microphone signal, as well as drum groups and other effects. The output signals can be used together with the original microphone signals to enhance the individual drum sounds and/or to improve the whole drum mix.

Figure 7:
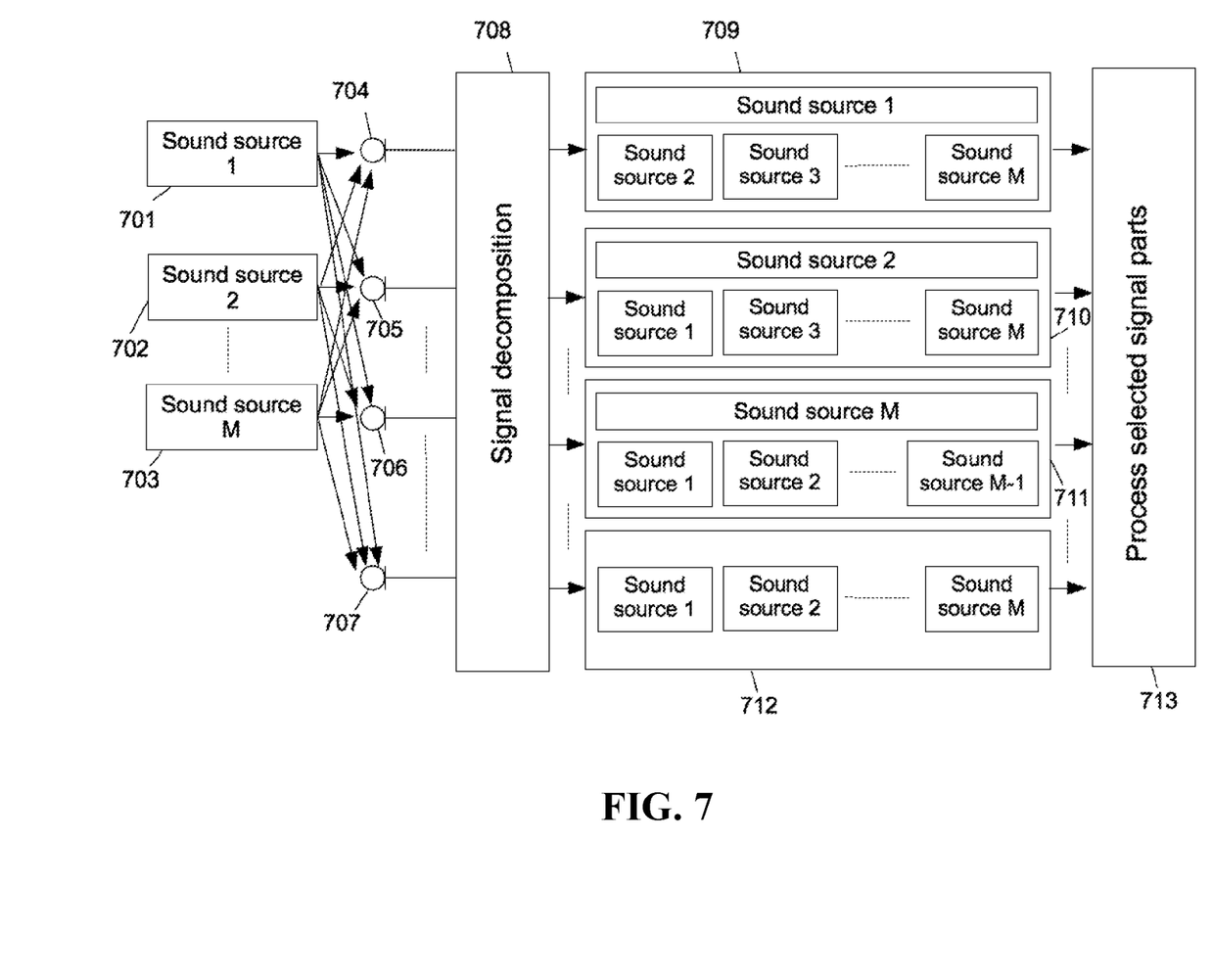
FIG. 7 illustrates an exemplary schematic representation of a method for processing selected parts of input signals.

In a particular embodiment (FIG. 7), M sound sources 701, 702, . . . , 703 are captured from any number of microphones 704, 705, 706, . . . , 707. Then a signal decomposition method is applied 708 in order to identify the contribution of each sound source in each microphone 709, 710, . . . , 711, . . . , 712. Contrary to the previous embodiments, in this example it's not necessary to decompose the microphone signals to the original sound sources (although this approach can be also followed). Instead, all or some of the signal parts that correspond to a specific sound source can be processed/mixed together 713 without separating the signals. For example, let's assume that sound source 1 corresponds to an acoustic guitar and that microphone 704 is the corresponding close microphone. Using prior art, when a sound engineer wants to add a sound effect to the guitar sound she/he would have applied the effect to the output of microphone 704. Using the present embodiment, if a sound engineer wants to add a sound effect to the guitar sound, she/he has the option to apply the effect to any part of sound source 1 as captured from all microphones (e.g. sound source 1 from 709, 710, . . . , 711, . . . , 712).

Figure 8:
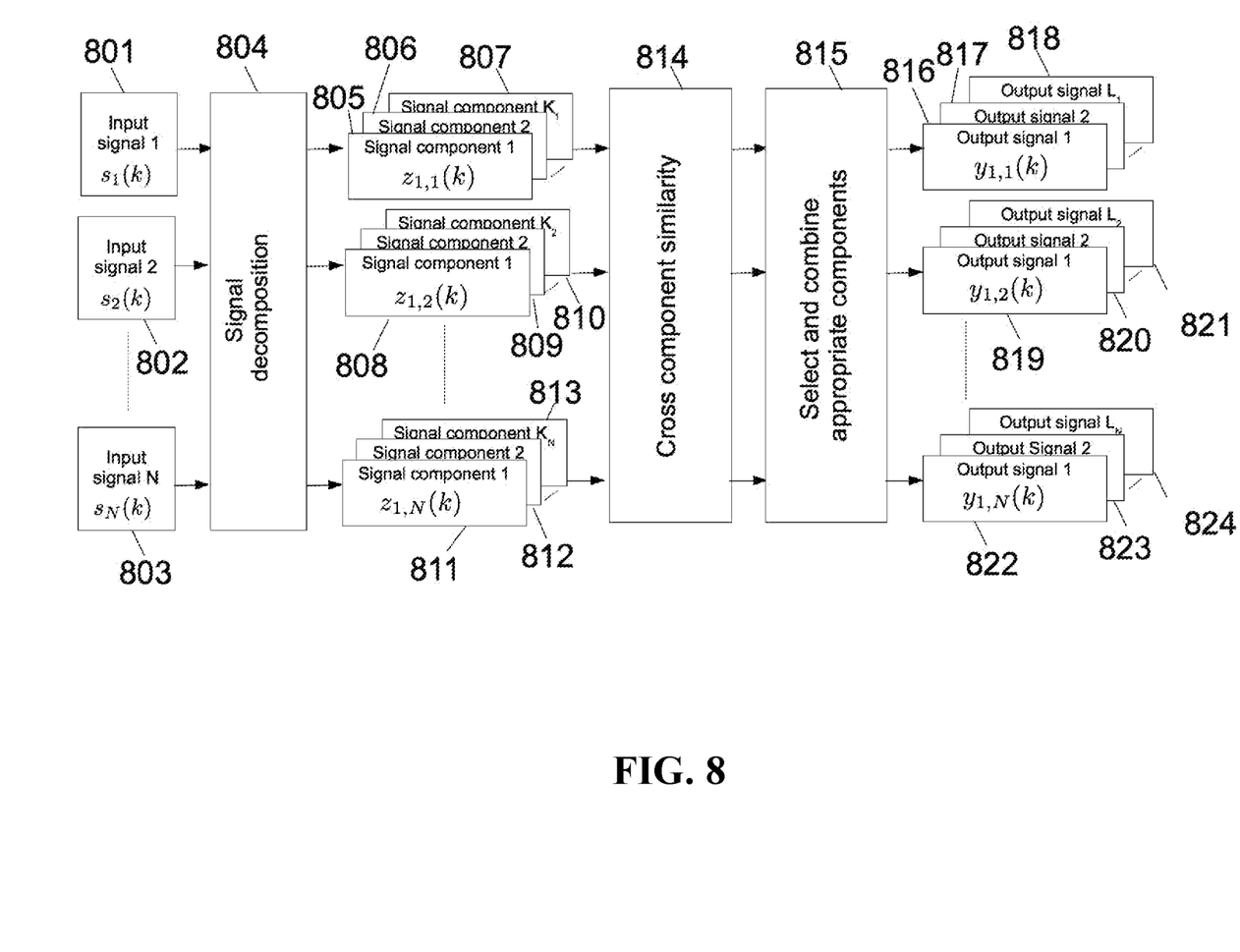
FIG. 8 illustrates an exemplary schematic representation of a method of sorting signals by exploring cross-component similarity measures.

In another embodiment, a cross-component similarity technique is applied in order to select the components that form the output signals (FIG. 8). For measuring similarity, any function or relationship that compares the corresponding signals can be used. A number of input signals 801, 802, . . . , 803 are fed into a signal decomposition method 804. Then a number of signal components $z_{K_x,N}(k)$ are extracted from each input signal. For example, components 805, 806, . . . , 807 are extracted from input signal 801, components 808, 809, . . . , 810 are extracted from input signal 802 and components 811, 812, . . . , 813 are extracted from input signal 803. Then cross component similarities are investigated and the multichannel information is taken into account 814 in order to select and combine appropriate components 815. The selection and combination of components 815 can be either user-assisted or automatic. Then a number of output signals is produced 816, 817, . . . , 818 and 819, 820, . . . , 821 and 822, 823, . . . , 824.

In prior art, it is typical to use sorting techniques in order to select appropriate components that form the output signals. Such techniques are for example described in the related application Ser. No. 14/011,981 and typically investigate any form of similarity between the extracted components and the corresponding input signal. For example, a typical measure for exploring the similarity of extracted components and the corresponding input signal is the cosine similarity.

Figure 9:
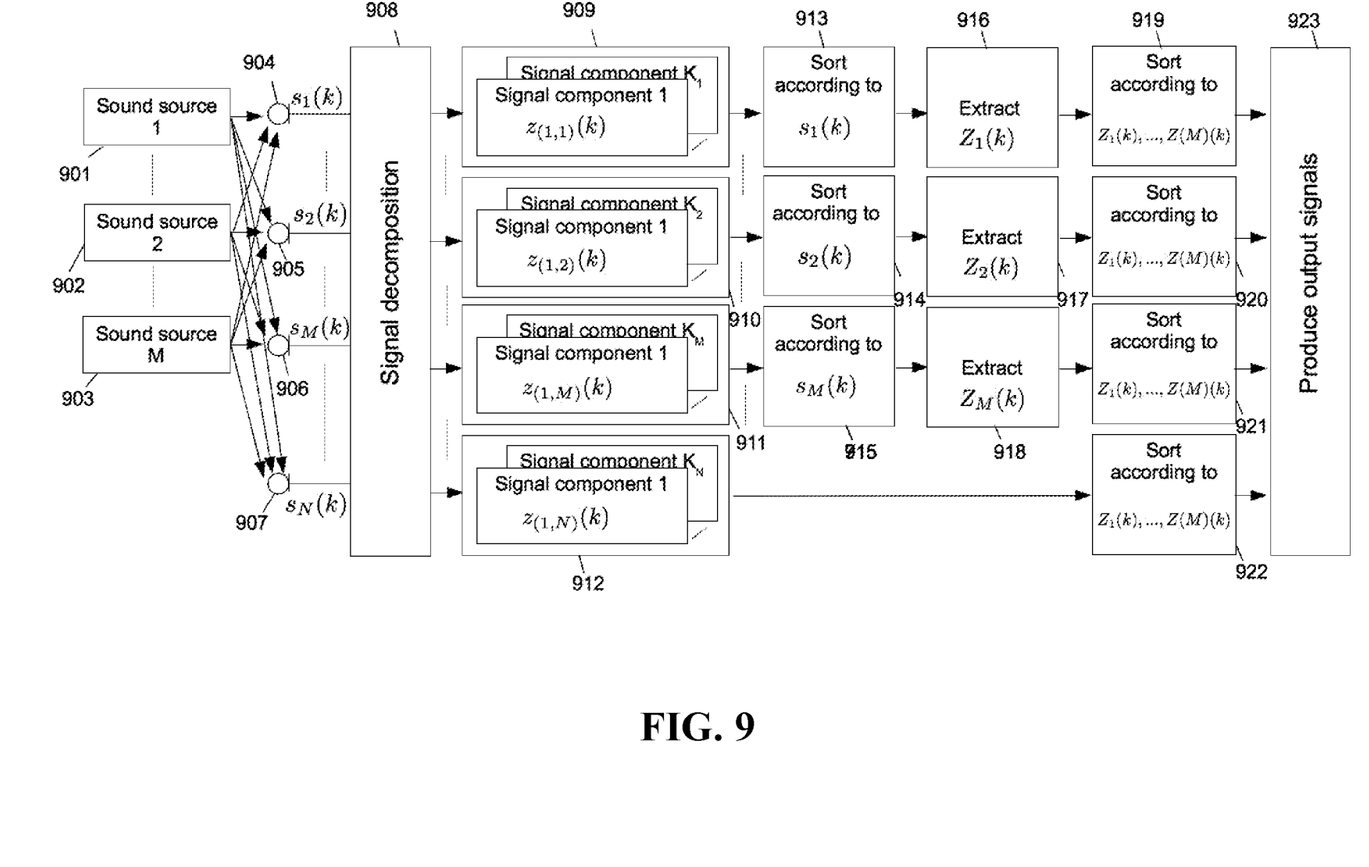
FIG. 9 illustrates an exemplary schematic representation of a method of sorting signals when multichannel information is available.

In a particular embodiment of the present application, it is instead proposed to investigate any cross-component similarity and explore the available close-microphone multichannel information. In a particular setup, we may have M sound sources 901, 902, . . . , 903 captured by N microphones (N>M) 904, 905, . . . , 906, . . . , 907 and some of the sources have a dedicated close microphone 904, 905, . . . , 906. Assuming an analog to digital conversion stage after sound capturing, the microphone input signals can be represented in the discrete time domain as $s_1(k)$, $s_2(k)$, . . . , $s_M(k)$, . . . , $s_N(k)$. After signal decomposition 908, corresponding signal components $z_{j,m}(k)$ (j denotes the number of component and m denotes the input signal number) are produced for each microphone signal 909, 910, . . . , 911, . . . , 912. Then the signal components of the close microphones are sorted via any appropriate sorting technique, including but not limited to those described in the related application Ser. No. 14/011,981 913, 914, . . . , 915. Since each close microphone has a related source signal and it contains significant energy of this signal, the sorting procedure can reveal the components relevant to each microphone's related source $Z_m(k)$ 916, 917, . . . , 918. Alternatively, $Z_m(k)$ can be defined manually by a user or via an appropriate graphical interface. Then, any cross-component similarity measure between $Z_1(k), \ldots, Z_M(k)$ and $z_{j,m}(k)$ can be derived 919, 920, . . . , 921, . . . , 922. For producing the output signals, any technique can be used 923. For example a threshold of similarity T can be defined and:

When the calculated similarity is higher than T, the components are assumed to correspond to the sound of the related source.

When the calculated similarity measure is lower than T, the components are assumed to correspond to the sound of any other source.

Alternatively, only the component with the largest similarity value can be assumed to belong to the related source. Alternatively, the components can be sorted and a user can select among them in order to produce the output signals. In some embodiments, particular sources or combination of sources can be identified and exported as output signals. In other embodiments particular sources can be identified in order to be excluded from certain output signals.

In particular embodiments, similarity measures or clustering techniques can be applied directly on the time domain signals or the signals can be transformed via any transform. For example, the signals can be transformed in the time-frequency domain using any relevant technique such as a short-time Fourier transform (STFT), a wavelet transform, a polyphase filterbank, a multi rate filterbank, a quadrature mirror filterbank, a warped filterbank, an auditory-inspired filterbank, etc. In another embodiment, similarity measures or clustering techniques can be applied on the envelope of the signals. The signal envelope can be calculated via any appropriate technique such as low-pass filtering, Hilbert transform, etc. Using the envelope of the signals can be advantageous in multi-microphone setups. In these cases, the frequency content of the captured sound sources may differ significantly when comparing one microphone signal to the other; however the coarse time-domain content of the sound sources presents higher similarity and this can improve the accuracy of the results.

While the above-described flowcharts have been discussed in relation to a particular sequence of events, it should be appreciated that changes to this sequence can occur without materially effecting the operation of the invention. Additionally, the exemplary techniques illustrated herein are not limited to the specifically illustrated embodiments but can also be utilized and combined with the other exemplary embodiments and each described feature is individually and separately claimable.

Additionally, the systems, methods and protocols of this invention can be implemented on a special purpose computer, a programmed micro-processor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively the disclosed methods may be readily implemented in software on an embedded processor, a micro-processor or a digital signal processor. The implementation may utilize either fixed-point or floating point operations or both. In the case of fixed point operations, approximations may be used for certain mathematical operations such as logarithms, exponentials, etc. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The systems and methods illustrated herein can be readily implemented in hardware and/or software using any known or later developed systems or structures, devices and/or software by those of ordinary skill in the applicable art from the functional description provided herein and with a general basic knowledge of the audio processing arts.

Moreover, the disclosed methods may be readily implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated system or system component, or the like. The system can also be implemented by physically incorporating the system and/or method into a software and/or hardware system, such as the hardware and software systems of an electronic device.

It is therefore apparent that there has been provided, in accordance with the present invention, systems and methods for improved signal decomposition in electronic devices. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A system that processes audio signals comprising:
a first microphone that receives a first signal mixture related to a first and a second source signal;
a second microphone that receives a second signal mixture related to at least the first and the second source signal, wherein the first microphone is a primary microphone for the first and the second source signal and is placed close to a first and a second source, and wherein the second microphone is an ambient microphone and is placed at a location that is further than the first microphone from the first and the second source to capture sound signals coming from a plurality of sources including from the first and the second source;
wherein a distance between the first and second microphone is capable of being changed;
a signal decomposer that operates on the first signal mixture to isolate a first signal component of an intrinsic part of the first source signal, wherein the intrinsic part is a beginning portion of the first source signal;
the signal decomposer also operates on the second signal mixture to isolate a second signal component of the intrinsic part of the first source signal; and
a processor that processes at least a portion of each of the first and second signal components to generate an enhanced beginning portion of the first source signal.

2. The system of claim 1, wherein one source signal is an audio signal from a singing voice, or a stringed instrument, or a wind instrument, or an electric guitar, or a keyboard, or a drum or a musical instrument.

3. The system of claim 1, wherein the processing of the at least a portion of each of the first and second signal components includes one or more of time-aligning said components, combining said components and selecting said components.

4. The system of claim 1, wherein said processing includes mapping the at least a portion of said first and said second signal components to digital audio workstation tracks or to at least one mixing channel.

5. The system of claim 1, wherein the signal decomposer utilizes a signal decomposition method including one or more of non-negative matrix factorization, non-negative tensor factorization, independent component analysis, principal component analysis, singular value decomposition, dependent component analysis, low-complexity coding and decoding, stationary subspace analysis, common spatial pattern, empirical mode decomposition, tensor decomposition, canonical polyadic decomposition, higher-order singular value decomposition, or tucker decomposition.

6. The system of claim 1, wherein the enhanced onset beginning portion that is generated is output as an audio signal.

7. A system that processes audio signals comprising:
a first microphone that receives a first signal mixture related to a first and a second source signal;
a second microphone that receives a second signal mixture related to at least the first and the second source signal, wherein the first microphone is a primary microphone for the first and the second source signal and is placed close to a first and a second source, and wherein the second microphone is an ambient microphone and is placed at a location that is further than the first microphone from the first and the second source to capture sound signals coming from a plurality of sources including from the first and the second source;
wherein a distance between the first and second microphone is capable of being changed;

a signal decomposer that operates on the first signal mixture to isolate a first signal component of an intrinsic part of the first source signal, wherein the intrinsic part is an end portion of the first source signal;

the signal decomposer also operates on the second signal mixture to isolate a second signal component of the intrinsic part of the first source signal; and a processor that processes at least a portion of each of the first and second signal components to generate an enhanced end portion of the first source signal.

8. The system of claim 7, wherein one source signal is an audio signal from a singing voice, or a stringed instrument, or a wind instrument, or an electric guitar, or a keyboard, or a drum or a musical instrument.

9. The system of claim 7, wherein the processing of the at least a portion of each of the first and second signal components includes one or more of time-aligning said components, combining said components and selecting said components.

10. The system of claim 7, wherein said processing includes mapping the at least a portion of said first and said second signal components to digital audio workstation tracks or to at least one mixing channel.

11. The system of claim 7, wherein the signal decomposer utilizes a signal decomposition method including one or more of non-negative matrix factorization, non-negative tensor factorization, independent component analysis, principal component analysis, singular value decomposition, dependent component analysis, low-complexity coding and decoding, stationary subspace analysis, common spatial pattern, empirical mode decomposition, tensor decomposition, canonical polyadic decomposition, higher-order singular value decomposition, or tucker decomposition.

12. The system of claim 7, wherein the enhanced end portion that is generated is output as an audio signal.

13. A non-transitory computer-readable information storage medium having stored thereon instructions, that when executed by a processor, cause the processor to perform operations comprising:

receiving, from a first microphone, a first signal mixture related to a first and a second source signal;

receiving, from a second microphone, a second signal mixture related to at least the first and the second source signal, wherein the first microphone is a primary microphone for the first and the second source signal and is placed close to a first and a second source, and wherein the second microphone is an ambient microphone and is placed at a location that is further than the first microphone from the first and the second source to capture sound signals coming from a plurality of sources including the first and the second sound source;

wherein a distance between the first and second microphone is capable of being changed;

isolating a first signal component related to an intrinsic part of the first source signal, wherein the intrinsic part is a beginning portion of the first source signal, and wherein said isolating is performed by operating on the first signal mixture;

isolating a second signal component related to the intrinsic part of the first source signal, wherein said isolating is performed by operating on the second signal mixture;

saving, in a storage, at least a portion of each of the first and second signal components; and processing the at least a portion of each of the first and second signal components to generate an enhanced beginning portion of the first source signal.

14. The non-transitory computer-readable information storage medium of claim 13, wherein the first source signal is an audio signal from a singing voice, or a stringed instrument, or a wind instrument, or an electric guitar, or a keyboard, or a drum or a musical instrument.

15. The non-transitory computer-readable information storage medium of claim 13, wherein the processing of the at least a portion of each of the first and second signal components includes one or more of time-aligning said components, combining said components and selecting said components.

16. The non-transitory computer-readable information storage medium of claim 13, wherein said processing includes mapping the at least a portion of said first and said second signal components to digital audio workstation tracks or to at least one mixing channel.

17. The non-transitory computer-readable information storage medium of claim 13, wherein the isolating utilizes a signal decomposition method including one or more of non-negative matrix factorization, non-negative tensor factorization, independent component analysis, principal component analysis, singular value decomposition, dependent component analysis, low-complexity coding and decoding, stationary subspace analysis, common spatial pattern, empirical mode decomposition, tensor decomposition, canonical polyadic decomposition, higher-order singular value decomposition, or tucker decomposition.

18. A non-transitory computer-readable information storage medium having stored thereon instructions, that when executed by a processor, cause the processor to perform operations comprising:

receiving, from a first microphone, a first signal mixture related to a first and a second source signal;

receiving, from a second microphone, a second signal mixture related to at least the first and the second source signal, wherein the first microphone is a primary microphone for the first and the second source signal and is placed close to a first and a second source, and wherein the second microphone is an ambient microphone and is placed at a location that is further than the first microphone from the first and the second source to capture sound signals coming from a plurality of sources including the first and the second sound source;

wherein a distance between the first and second microphone is capable of being changed;

isolating a first signal component related to an intrinsic part of the first source signal, wherein the intrinsic part is an end portion of the first source signal, and wherein said isolating is performed by operating on the first signal mixture;

isolating a second signal component related to the intrinsic part of the first source signal, wherein said isolating is performed by operating on the second signal mixture;

saving, in a storage, at least a portion of each of the first and second signal components; and processing the at least a portion of each of the first and second signal components to generate an enhanced end portion of the first source signal.

19. The non-transitory computer-readable information storage medium of claim 18, wherein the first source signal is an audio signal from a singing voice, or a stringed instrument, or a wind instrument, or an electric guitar, or a keyboard, or a drum or a musical instrument.

20. The non-transitory computer-readable information storage medium of claim 18, wherein the processing of the at least a portion of each of the first and second signal components includes one or more of time-aligning said components, combining said components and selecting said components.

21. The non-transitory computer-readable information storage medium of claim 18, wherein said processing includes mapping the at least a portion of said first and said second signal components to digital audio workstation tracks or to at least one mixing channel.

22. The non-transitory computer-readable information storage medium of claim 18, wherein the isolating utilizes a signal decomposition method including one or more of non-negative matrix factorization, non-negative tensor factorization, independent component analysis, principal component analysis, singular value decomposition, dependent component analysis, low-complexity coding and decoding, stationary subspace analysis, common spatial pattern, empirical mode decomposition, tensor decomposition, canonical polyadic decomposition, higher-order singular value decomposition, or tucker decomposition.

\* \* \* \* \*

UNITED STATES PATENT AND TRADEMARK OFFICE
CERTIFICATE OF CORRECTION

PATENT NO. : 11,610,593 B2
APPLICATION NO. : 16/674135
DATED : March 21, 2023
INVENTOR(S) : Alexandros Tsilfidis et al.

It is certified that error appears in the above-identified patent and that said Letters Patent is hereby corrected as shown below:

In the Claims

In Column 10, Claim 6, Line 50, delete "enhanced onset" and insert -- enhanced --, therefor.

Signed and Sealed this
Seventeenth Day of October, 2023

Katherine Kelly Vidal
Director of the United States Patent and Trademark Office